United States Patent
Swamy et al.

(10) Patent No.: US 8,274,803 B2
(45) Date of Patent: Sep. 25, 2012

(54) LOW STRESS SOFT CHARGE CIRCUIT FOR DIODE FRONT END VARIABLE FREQUENCY DRIVE

(75) Inventors: Mahesh M. Swamy, Gurnee, IL (US); Tsuneo Joe Kume, Kitakyushu (JP)

(73) Assignee: Yaskawa America, Inc., Waukegan, IL (US)

( * ) Notice: Subject to any disclaimer, the term of this patent is extended or adjusted under 35 U.S.C. 154(b) by 408 days.

(21) Appl. No.: 12/655,327

(22) Filed: Dec. 29, 2009

(65) Prior Publication Data

US 2011/0038185 A1  Feb. 17, 2011

Related U.S. Application Data

(60) Provisional application No. 61/204,732, filed on Jan. 9, 2009.

(51) Int. Cl.
*H02J 1/02* (2006.01)
(52) U.S. Cl. .......................................... 363/39; 318/140
(58) Field of Classification Search ............... 363/34–41, 363/44, 46, 89, 159, 160, 95; 219/44, 40 A–40 E, 219/46; 322/29, 10, 14, 20, 28, 31, 41; 318/800, 318/801, 807, 811
See application file for complete search history.

(56) References Cited

U.S. PATENT DOCUMENTS

| | | | | |
|---|---|---|---|---|
| 5,499,178 A | * | 3/1996 | Mohan | 363/39 |
| 5,568,371 A | * | 10/1996 | Pitel et al. | 363/39 |
| 5,903,116 A | * | 5/1999 | Geis et al. | 318/140 |
| 5,984,173 A | * | 11/1999 | Edwards | 323/207 |
| 6,154,378 A | * | 11/2000 | Peterson et al. | 363/37 |
| 6,737,845 B2 | * | 5/2004 | Hwang | 323/284 |

FOREIGN PATENT DOCUMENTS

JP    2005-6419    1/2005

OTHER PUBLICATIONS

Mahesh Swamy, Tsuneo J. Kume and Noriyuki Takada, "Evaluation of an Alternate Soft Charge Circuit for Diode Front End Variable Frequency Drives", $1_{st}$ IEEE ECCE Conference, San Jose, 2009.

Ajith H. Wijenayake, Tom Gilmore & Rich Lukaszewski and Dale Anderson & Gary Waltersdorf, "Modeling and Analysis of Shared/Common DC Bus Operation of AC Drives, Part 1", IEEE Industry Applications Society Annual Meeting 1997, New Orleans, Louisiana.

* cited by examiner

*Primary Examiner* — Rajnikant Patel
(74) *Attorney, Agent, or Firm* — Wood, Phillips, Katz, Clark & Mortimer (57) ABSTRACT

A variable frequency drive comprises a diode rectifier receiving multiphase AC power from a source and converting the AC power to DC power. An inverter receives DC power and converts the DC power to AC power to drive a load. A link circuit is connected between the diode rectifier and the inverter and comprises a DC bus to provide a relatively fixed DC voltage for the inverter. A bus capacitor is across the bus. A soft charge circuit limits inrush current to the bus capacitor. The soft charge circuit comprises an inductor connected between the source and the link circuit and a switch circuit in the link circuit for selectively providing a semiconverter configuration or a full bridge converter configuration to provide two stage charging of the bus capacitor.

20 Claims, 7 Drawing Sheets

LOW STRESS SOFT CHARGE CIRCUIT FOR DIODE FRONT END VARIABLE FREQUENCY DRIVE

CROSS REFERENCE TO RELATED APPLICATIONS

This application claims priority of application Ser. No. 61/204,732, filed Jan. 9, 2009.

FIELD OF THE INVENTION

The present invention relates to variable frequency drives and, more particularly, to a soft charge circuit including a two stage charging circuit.

BACKGROUND OF THE INVENTION

AC to DC rectifiers are widely used to convert AC line electric power to DC power to be used by inverters (for motor, UPS, and other applications), DC/DC converters, and passive loads such as resistors. In any rectifier circuit, the AC line voltages are rectified and ripple of the rectified voltage is filtered using a parallel capacitor and occasionally a series inductor. This results in a fixed, i.e., ripple free, DC voltage.

Without appropriate pre-charge circuitry, the start-up transients can be harmful to the systems. If the AC line and/or the DC link filters do not have sufficient impedance, uncontrolled current of large magnitude will flow upon closing a three-phase supply switch. This large surge current charges the capacitor and depending on the system impedance, the surge current can reach prohibitive levels. As a result, the rectifier diodes and the filter components (inductors and DC bus capacitor) may fail due to the excessive current/voltage through them. The transients may also create electromagnetic interference that may interfere with other equipment in the power system and can lead to nuisance failure. Therefore, during start-up it is mandatory to establish a high impedance path between the large AC line voltages and the DC bus capacitor. This task can be accomplished by a pre-charge or soft charge circuit that is placed in series with the DC link output of the rectifier. The main task of the soft charge circuit is to exhibit sufficiently high impedance during start-up and zero impedance during normal operation.

Figure 1A:
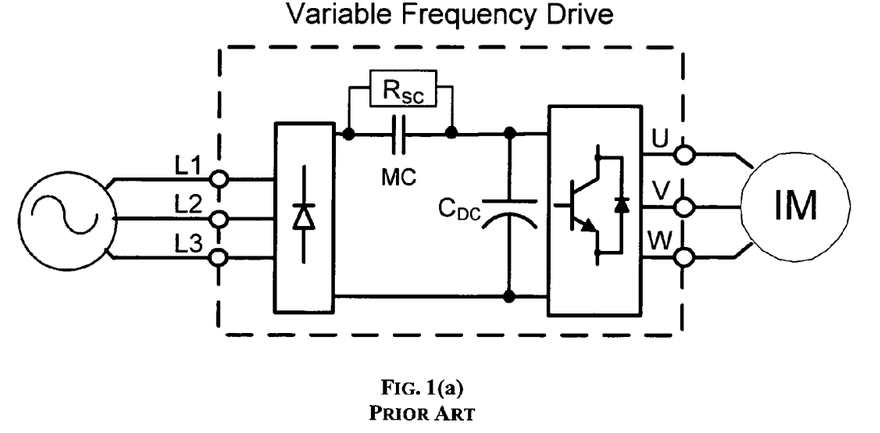
FIG. 1(a) is a generalized schematic of a prior art variable frequency drive.

Known voltage source inverters (VSI) that have a large DC bus capacitor filter use a resistor-contactor arrangement to limit the inrush current into the capacitors, and thereby provide a means to soft-charge the DC bus capacitor $C_{DC}$, see FIG. 1(a). Because of the mechanical nature of the contactor, the reliability of the variable frequency drive (VFD) is adversely affected. Moreover, the time delay involved in the basic response of the contactor can result in an unfavorable sequence of events during a brown out condition. Given these facts, the soft-charge circuit is often considered to be the weakest part of an otherwise well designed VFD.

The typical prior art VFD system shown in FIG. 1(a) employs the soft charge circuit including a resistor $R_{SC}$ and a contactor switch MC connected in parallel. The resistor $R_{SC}$ is sized for the start-up charging transient while the contactor switch MC is sized for the normal operation. During start-up the contactor switch MC is open (not conducting) and it remains so until the DC bus capacitor voltage reaches a critical value (roughly near rated operating voltage). Once the critical voltage level is reached, then the contactor switch MC is closed, and the resistor $R_{SC}$ is by-passed.

The rectifier system of FIG. 1(a) exhibits high energy-efficiency because the contactor switch MC has very low conduction losses and the large pre-charge transients are limited to less harmful levels. If for any reason the input AC supply experiences a large dip either due to brown out condition or due to a large load being suddenly applied across the AC supply, there is a possibility that the soft-charge contactor does not open and remains closed. When the input AC supply recovers, the resulting surge current can be large and damage the input rectifiers, and the DC bus capacitor. When large current flows through the contactor MC during such events, the contacts can even melt and fuse together, rendering them useless for future use. Hence, by nature, this approach does not yield a highly reliable solution. Also, due to mechanical actuation, the mechanical contactor switch wear-out is rapid and inevitable. Therefore, the life of the contactor is limited and in general much shorter than most of the stationary electrical parts inside a rectifier system.

Figure 1B:
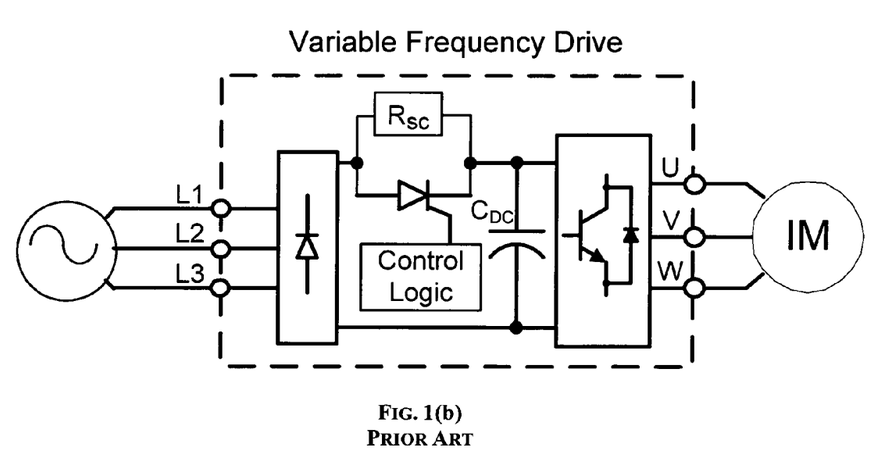
FIG. 1(b) is a generalized schematic of a prior art variable frequency drive.

There have been suggestions of replacing the magnetic contactor MC in FIG. 1(a) with a semiconductor switch, as shown in FIG. 1(b). However, the semiconductor switch requires intelligent control logic circuitry and is associated with steady-state power loss.

Figure 2:
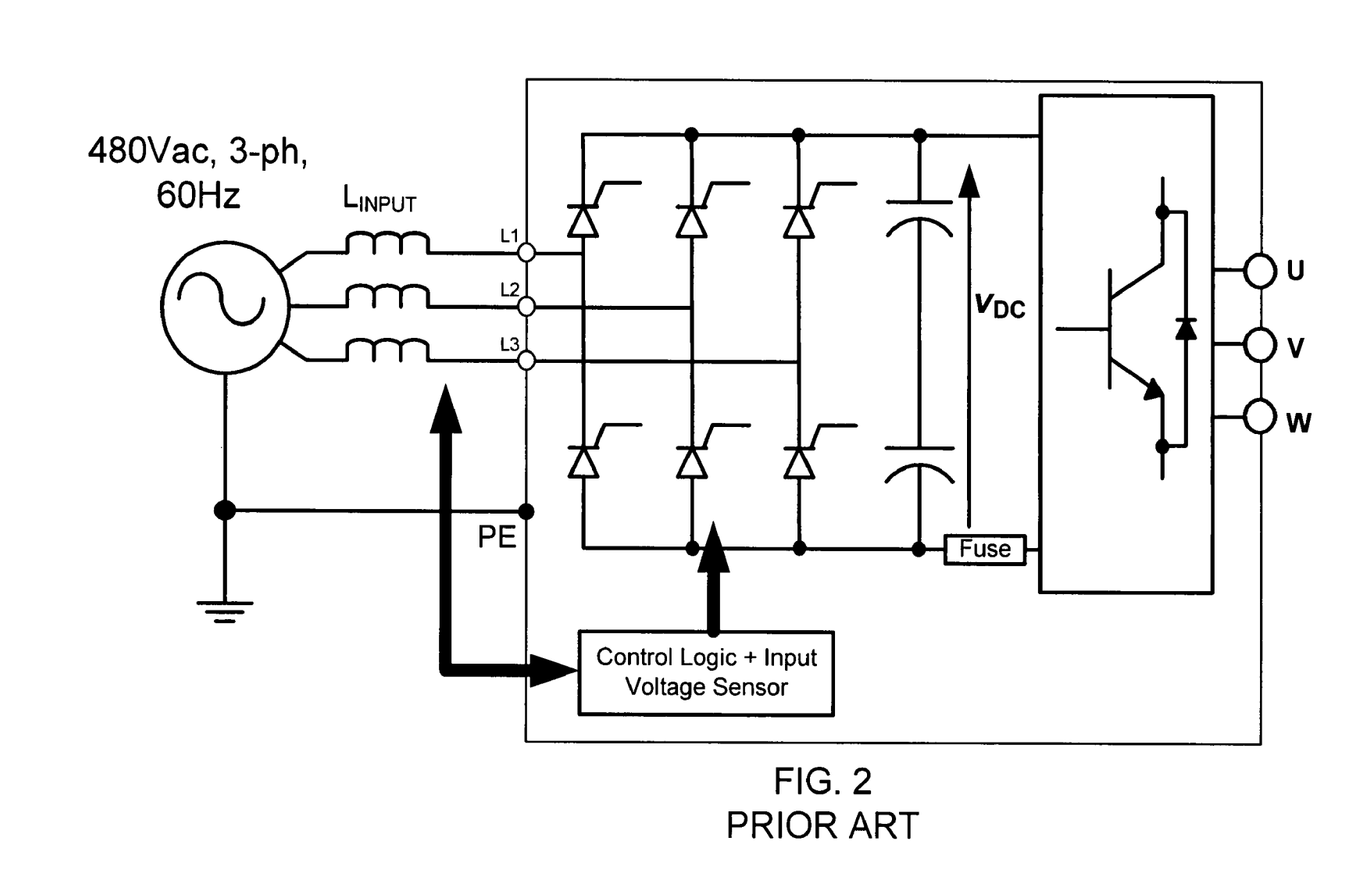
FIG. 2 is a generalized schematic of a prior art variable frequency drive.

Thyristor controlled rectifiers have been used in VFDs but the additional gate circuit adds cost and increases the component count, which reduces reliability. With one known topology, the input rectifiers are replaced by thyristors. The triggering angle of the thyristors is controlled in such a manner that the DC bus capacitor charges up smoothly with no inrush. When a brown out occurs, the thyristor angle is such that it provides the maximum output voltage possible, similar to a typical diode bridge. When the voltage recovers after a brown out condition, the difference between the peak value of the input voltage and the DC link voltage is large enough to force the triggering angle to increase and thereby reduce the high inrush current. The technique, shown in FIG. 2, is well established and is used by some VFD manufacturers. However, this VFD needs six pack thyristor modules, which can be expensive, especially for small sizes due to low volume of production by semiconductor manufacturers. The VFD needs six gate-trigger circuits along with sensing and decision making logic (The trigger circuits along with the necessary logic occupy space and are expensive). The thyristors may cause a voltage notching effect if the regulated output voltage is lower than that achievable from the input ac source—this will require the use of input ac inductor that occupies space and is an added cost. Finally, gate drive and logic circuits reduce mean time between failures (MTBF) due to the increased component count in the VFD.

Figure 3A:
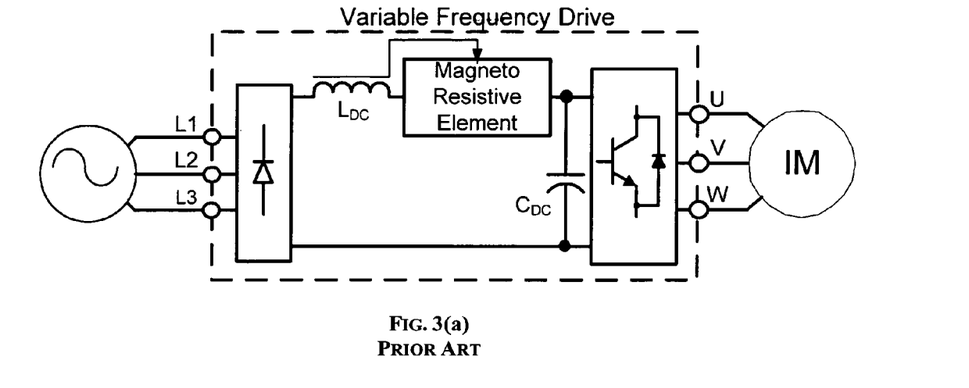
FIG. 3(a) is a generalized schematic of a prior art variable frequency drive.
Figure 3B:
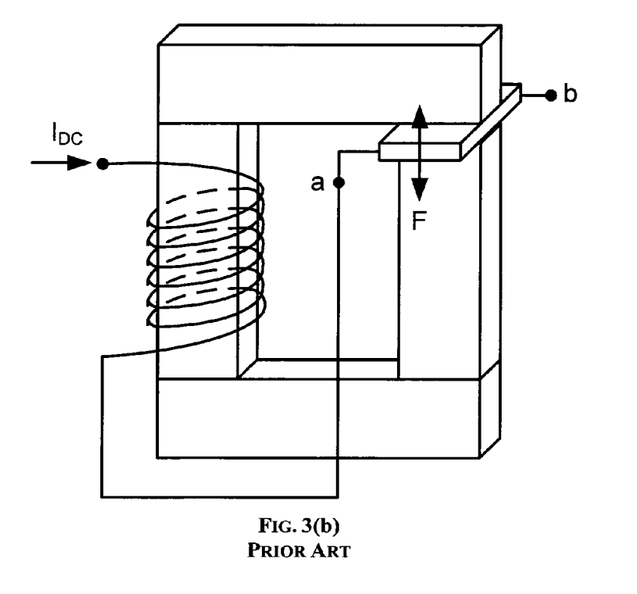
FIG. 3(b) is a generalized diagram of a magnetoresistive element used in the drive of FIG. 3(a)

A second alternative topology uses a Magneto Resistive (MR) device that shows high resistance under the influence of large magnetic field and low resistance when the magnetic field resets to a lower level. The MR element could be connected in series with the DC bus capacitor to soft charge it at start up or during the recovery time after a brown out condition. The circuit configuration is shown in FIG. 3(a) and the conceptual schematic in FIG. 3(b).

In place of an E-I core based inductor, one can use a toroid and embed the MR element in the air-gap of the toroidal inductor. However, there are important issues to consider while implementing an MR element based solution. The behavior of the MR element at elevated operating temperature should be considered. Since, most of the heat is produced in the air-gap of an inductor, placing an MR element in the air-gap needs careful engineering. Also, since rated load current has to pass through the MR element, this idea may be limited to small power systems due to the limitation of presently available material. When the rated current increases, the MR element can become large and placing it in the air gap may pose a problem.

The present invention is directed to solving the problems discussed above, in a novel and simple manner.

SUMMARY OF THE INVENTION

In accordance with the invention, there is provided a variable frequency drive with a two stage charging circuit.

Broadly, there is disclosed in accordance with one aspect of the invention, a voltage source inverter comprising a rectifier circuit having an input for receiving multiphase AC power and converting the AC power to DC power at an output. An inverter circuit receives DC power and converts the DC power to AC power. A link circuit is connected between the rectifier circuit and the inverter circuit and comprises a DC bus having first and second rails to provide a relatively fixed DC voltage for the inverter. A bus capacitor is across the bus. A soft charge circuit limits inrush current to the bus capacitor. The soft charge circuit comprises an inductor connected between the rectifier input and the second rail and a switch circuit in the second rail between the rectifier output and the bus capacitor to provide two stage charging of the bus capacitor.

It is a feature of the invention that the inductor comprises a wye connected inductor having a neutral point connected to the second rail. A blocking diode is connected between the second rail and the inductor.

It is another feature of the invention that the soft charge circuit further comprises a sensing circuit for sensing bus voltage and a control circuit for controlling the switch circuit responsive to sensed voltage. The sensing circuit comprises a voltage divider connected across the link circuit.

It is a further feature of the invention that the soft charge circuit further comprises a control circuit for controlling the switch circuit responsive to a select time period.

It is another feature of the invention that the control circuit turns the switch off if sensed voltage is below a select brown out level voltage.

There is disclosed in accordance with another aspect of the invention a variable frequency drive comprising a diode rectifier receiving multiphase AC power from a source and converting the AC power to DC power. An inverter receives DC power and converts the DC power to AC power to drive a load. A link circuit is connected between the diode rectifier and the inverter and comprises a DC bus to provide a relatively fixed DC voltage for the inverter. A bus capacitor is across the bus. A soft charge circuit limits inrush current to the bus capacitor. The soft charge circuit comprises an inductor connected between the source and the link circuit and a switch circuit in the link circuit for selectively providing a semiconverter configuration or a full bridge converter configuration to provide two stage charging of the bus capacitor.

There is disclosed in accordance with a further aspect of the invention a soft charge circuit for a diode rectifier front end variable frequency drive comprising a DC bus having a positive rail and a negative rail to provide a relatively fixed DC voltage. A bus capacitor is across the bus. An inductor is in the positive rail. An inductor is connected between a diode rectifier input and the negative rail. A switch circuit in the negative rail provides two stage charging of the bus capacitor.

Further features and advantages of the invention will be readily apparent from the specification and the drawing.

DETAILED DESCRIPTION OF THE INVENTION

The present invention uses alternative techniques to soft charge a DC bus capacitor. The technique uses two stage charging and should be able to handle brown out conditions in an efficient manner. The drive unit is both compact and economical. An exemplary topology in accordance with the invention, shown in FIG. 4, generally satisfies these features.

The proposed topology includes features similar to a typical star-delta starter used in conventional 3-phase ac motors. The dc bus capacitor is charged as a "semiconverter" at startup. Once the dc bus voltage reaches the steady state voltage dictated by the semiconverter, the full converter configuration is engaged, resulting in a second charge up period. Since the charging is carried out in two stages, the inrush current through the inductor, capacitor, and diode is well controlled with almost no stress. The switching from the semiconverter configuration to the full bridge configuration can either be dictated by level of dc bus voltage or by a timer. Both methods are presented here. All results used in the comparison are based on simulation.

Figure 4:
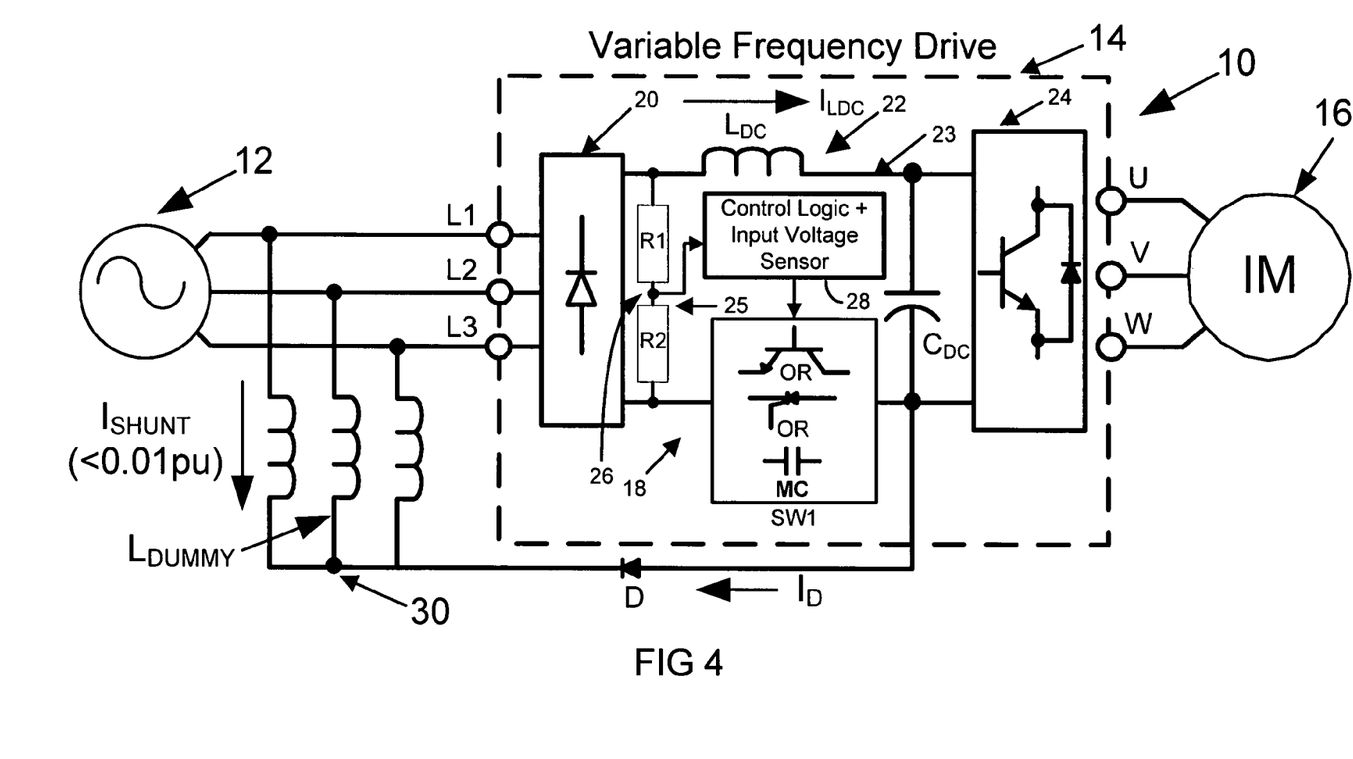
FIG. 4 is a schematic diagram of a variable frequency drive in accordance with the invention.

Referring particularly to FIG. 4, a motor drive system 10 is illustrated. The motor drive system 10 includes an AC source 12 and a variable frequency drive (VFD) 14 for driving an induction motor 16. As is known, a control unit (not shown) would be used for controlling the VFD 14. However, such control unit is not shown herein as it does not itself form part of the invention. Instead, the invention relates particularly to a soft charge circuit 18, described below.

The AC source 12 may comprise a drive or the like developing three phase AC power on feeder conductors labeled L1, L2 and L3. The VFD 14, as described more particularly below, converts the AC power to DC power and converts it back to AC power at a select frequency which is then impressed across terminals U, V and W. The terminals U, V and W are connected to feeder conductors to drive the motor 16, as is known.

The VFD 14 includes an AC/DC converter 20 connected by a DC link circuit 22 to a DC/AC converter 24. In an illustrative embodiment of the invention, the AC/DC converter 20 comprises a full wave bridge rectifier circuit of conventional construction which is operable to convert three phase AC power to DC power. Particularly, the AC/DC converter 20 comprises a diode rectifier. The DC link circuit 22 comprises a DC bus 23 defined by rails labeled "+" and "−". A DC bus capacitor $C_{DC}$ is connected across the DC bus 23. The DC/AC converter 24 comprises an inverter section. Typically, the inverter section comprises a pulse width modulation inverter using solid state switching devices connected in a three phase bridge configuration to the DC bus 23 to develop power at the terminals U, V and W. The switches are pulsed width modulated by control signals using a conventional control scheme. Particularly, the PWM inverter 24 is controlled to create a sinusoidal effect for the induction motor 16. The pulse frequency is typically fixed. The pulse width is varied to very sinusoidal frequency.

As will be apparent, the soft charge circuit 18 in accordance with the invention is not limited to use with any particular AC/DC converter and/or DC/AC converter.

The soft charge circuit 18 comprises a link inductor $L_{DC}$ in the + rail. A voltage divider 25 comprises series resistors $R_1$ and $R_2$ connected across the output of the AC/DC converter 20. The voltage divider 25 comprises a sensing circuit having a node 26 between the resistors $R_1$ and $R_2$ representing DC bus voltage. The node 26 is connected to a control logic block 28 which senses voltage from the node 26 and controls a switch SW1 in the—rail of the DC bus 23. The control logic block may comprise a separate circuit or may form part of the overall control circuit for the VFD 14, as necessary or desired. The switch SW1 may comprise a transistor, an IGBT, a FET a contactor switch, or the like. A wye connected dummy inductor $L_{DUMMY}$ is connected to the feeder conductors L1, L2 and L3 and has a neutral point 30 connected via a blocking diode D to the—rail of the DC bus 23.

Figure 5:
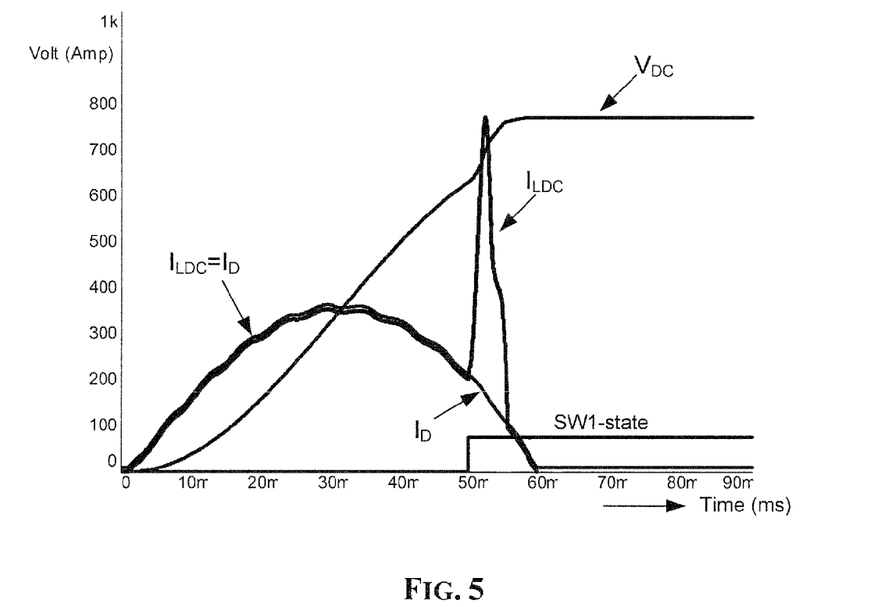
FIG. 5. is a graph illustrating simulation results for the topology shown in FIG. 4 where SW1 is activated based on level of dc bus voltage.
Figure 6:
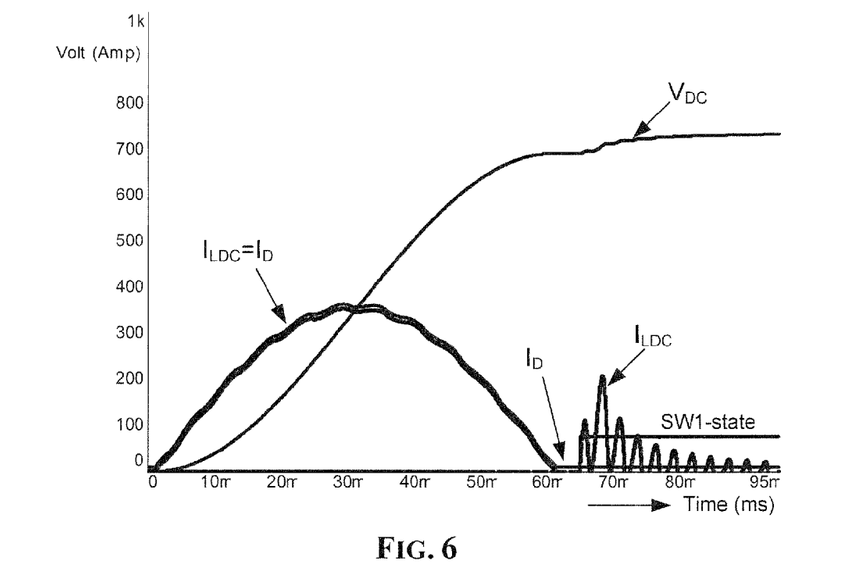
FIG. 6. is a graph illustrating simulation results for the topology shown in FIG. 4 where SW1 is shown activated after a pre-determined time of 65 ms.

When the AC power source 12 supplies AC power to the VFD 14, an inrush current begins to flow, assuming that the dc bus capacitor $C_{DC}$ has no initial stored voltage. The inrush current is directed to flow into the wye connected dummy inductor $L_{DUMMY}$ through the blocking diode D, by maintaining the auxiliary switch SW1 in the OFF state. Since the impedance of the wye connected dummy inductor $L_{DUMMY}$ can be chosen, the charging time as well as the peak amplitude of charging current can be manipulated. Hence, the inrush current through the inductor $L_{DUMMY}$, capacitor $C_{DC}$, and diode D is well controlled with almost no stress. The switching from the semi-converter configuration to the full bridge configuration can either be dictated by level of DC bus voltage or by a timer. Both these methods have been simulated and found to yield acceptable results as shown in FIGS. 5 and 6, discussed below.

The value of the dummy inductor $L_{DUMMY}$ in FIG. 4 is chosen to be such that the resulting circulating current is about 0.01 pu of the rated current. The operation is divided into two charging intervals, which are discussed next.

Interval 1 ($t_1$-$t_2$)

Figure 4A:
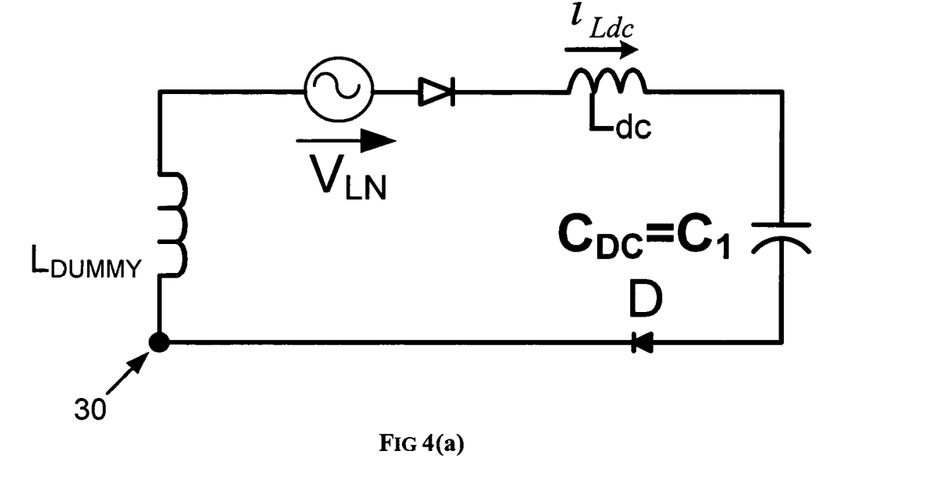
FIG. 4(a) is an equivalent circuit diagram for the drive of FIG. 4 during a first charging interval.

Referring to FIG. 4(a), an equivalent circuit diagram for the drive of FIG. 4 during a first charging interval, interval 1, is shown. Interval 1 begins at a time $t_1$, time 0 in FIG. 5, when the power is turned ON. Initially, the switch SW1 remains OFF. The peak of line-neutral voltage (instead of the line-line voltage) is applied across the inductor-capacitor-dummy neutral point. This interval continues until the voltage $V_{DC}$ across the DC bus capacitor slowly rises to approximately twice the peak line-neutral voltage at a time $t_2$. This voltage level is theoretically computed below. The equivalent circuit shows that the current flows through one of the three diodes and returns to the dummy neutral 30. By selecting the value of the dummy inductor $L_{DUMMY}$, the rate of rise of the charging current as well as the amplitude of the current can be easily controlled.

The expression for capacitor current ($i_{C1}$) for zero initial capacitor voltage is:

$$i_{C1} = \frac{V_{dc(pk)}}{\sqrt{(L_{DUMMY} + L_{dc})/C_1}} \sin(\omega_1 t); \omega_1 = \frac{1}{\sqrt{(L_{DUMMY} + L_{dc}) \cdot C_1}}; \quad (1)$$

$$V_{dc(pk)} = \sqrt{2} \cdot \frac{V_{LL(rms)}}{\sqrt{3}} = 0.816 \cdot V_{LL(rms)} \quad (2)$$

$$v_{C1} = V_{dc(pk)}(1 - \cos(\omega_1 t)) \quad (3)$$

$$v_{Ldc} = V_{dc(pk)} - v_{C1} = V_{dc(pk)} \cdot \cos(\omega_1 t) \quad (4)$$

From equation 3, it is noted that the peak value of the DC bus capacitor $C_{DC}$ can theoretically reach only two times $V_{dc(pk)}$, which is computed to be 1.632 times the rms value of the input line-line voltage. For a 480V system, this value is computed to be 783.8V, which is much lower than the typical over voltage fault point of most VFDs rated at 480V and is only 15.4% higher than the regular peak value of the line-line voltage. Practically, the actual voltage will be much lower than 783.8V due to the resistive drops across the dummy inductor $L_{DUMMY}$, the dc link choke $L_{DC}$, the forward voltage drop across the diodes, and the system impedance.

Interval 2 ($t_2$-$t_3$)

Figure 4B:
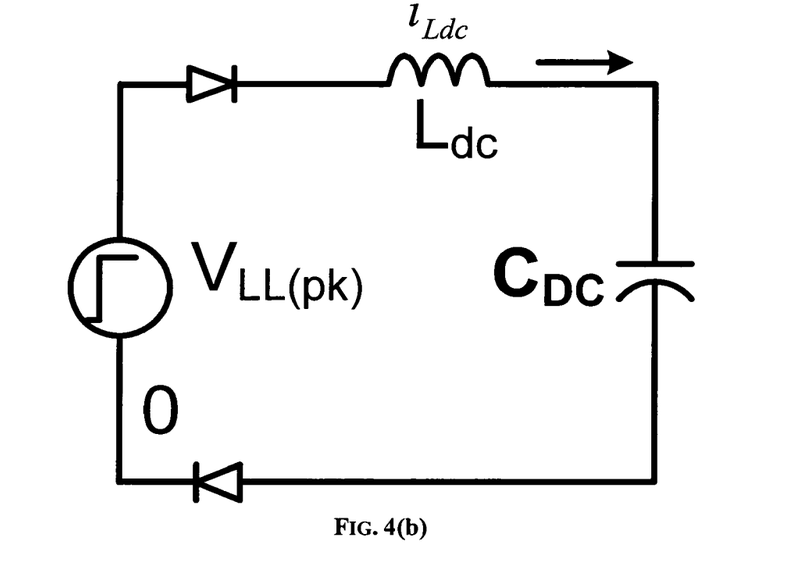
FIG. 4(b) is an equivalent circuit diagram for the drive of FIG. 4 during a second charging interval.

Referring to FIG. 4(b), an equivalent circuit diagram for the drive of FIG. 4 during a second charging interval, interval 2, is shown. The waveforms and circuit condition for this interval depends on the control philosophy adopted for turning on switch SW1.

If the switch SW1 is turned ON after the dc bus voltage $V_{DC}$ has reached a predetermined level, there will be a current transient depending on the instantaneous value of the line-line voltage at the instant of turning on of SW1. The simulation result is shown in FIG. 5. The changeover from half-bridge configuration to full-bridge configuration is facilitated by detecting the level of the dc bus voltage $V_{DC}$ across the DC bus capacitor $C_{DC}$. The operating conditions assumed for simulation are as follows:

The input line-line voltage is assumed to be 528V, 60 Hz corresponding to 10% higher than nominal 480V;
  The DC link inductor $L_{DC}$ is assumed to be 10% lower than its nominal value based on the manufacturer's specification;
  The DC bus capacitor $C_{DC}$ is assumed to be 20% higher than its nominal value based on the manufacturer's specification;
  The equivalent series resistance (ESR) of the dc link inductor $L_{DC}$ and the DC bus capacitor $C_{DC}$ is determined from the manufacturer's datasheet;
  The parasitic resistance of the cable and the bus bars are assumed to be zero;
  The source is considered to have a short circuit capacity of 32,000 Amps (rms), with an X/R ratio of 5. For a 480V system, the value of the system inductance and resistance is computed to be 22.52 μH and 1.7 m-Ω;
  Power-up condition is simulated assuming no load is applied to the drive during power-up;
  The drive simulated is rated at 220-kW and the value of the dummy inductor chosen is 14 mH.
  The DC bus voltage at which the half-bridge topology is changed over to the full-bridge configuration is selected to be 600 Vdc.

Results of the Simulation are Given in FIG. 5.

From the result shown in FIG. 5, it is noted that even after the switch SW1 is closed at the time $t_2$, the large value of the dummy inductor $L_{DUMMY}$ keeps current flowing through the external diode D. During this period, two charging paths exist—one through the diode D and the other through the lower section of the full-bridge rectifier 20 diodes. In FIG. 5, the observed peak surge current is 987 A for a drive that has rated current of 515 Arms. The maximum value of the dc bus voltage is seen to be 773V, which is well below the over voltage trip level of 850V.

If a timer is used to turn on the switch SW1 at the time $t_2$, and the timer is set such that the switch SW1 turns ON after the capacitor has already achieved the maximum, the turning ON of SW1 may not cause any significant current transient.

Simulation results for the case when the switch SW1 is closed after a pre-determined and fixed time is shown in FIG. 6.

In FIG. 6, the observed peak surge current is 689 A for a drive that has rated current of 515 Arms. The maximum value of the DC bus voltage is seen to be 734V, which is well below the over voltage trip level of 850V.

The basic operation disclosed here requires the logic circuit 28. The switch SW1 can be a semiconductor switch or a mechanical contactor. The voltage stress across the switch SW1 is very low in either method described above. It should however be noted that a semiconductor switch has more losses than a mechanical contactor and this method can result in higher overall losses in the drive during normal operation. The need for a dummy inductor $L_{DUMMY}$ is another aspect of this topology that can be selected to reduce the amplitude of charging current.

During a brown-out condition, typically, the line-line voltage of either one or two phases fall down to a low level. This causes the DC bus voltage $V_{DC}$ to decrease. In some cases, the rectified DC bus voltage is still higher than the level that turns off the contactor in a traditional soft charge resistor-contactor arrangement. When the input line-line voltages recover, there is a large charging current since the soft charge resistor in a traditional system is shorted via the contactor under the condition mentioned above. The large charging current is limited only by the system impedance and the on-state drop of rectifier diodes. The high amplitude of charging current can damage the diodes and other vulnerable components of the system.

In order to avoid the conditions arising during a brown out situation, in the disclosed system, a logic decision making module is introduced. When the rectified voltage, before the DC bus filter, falls below a pre-determined level, the switch SW1 is turned off. This is much easier accomplished if the switch SW1 is a semiconductor switch instead of a mechanical contactor. When the switch SW1 is turned OFF, the rectifier 20 is effectively converted into a semiconverter rectifier. When the voltage recovers, the switch SW1 remains OFF and the DC bus voltage charges up as a semiconverter. Load remains turned off when the switch SW1 is in the off state. Once the DC bus voltage charging is complete, the switch SW1 is turned on again depending on the method adopted— timer or dc voltage level.

Figure 7:
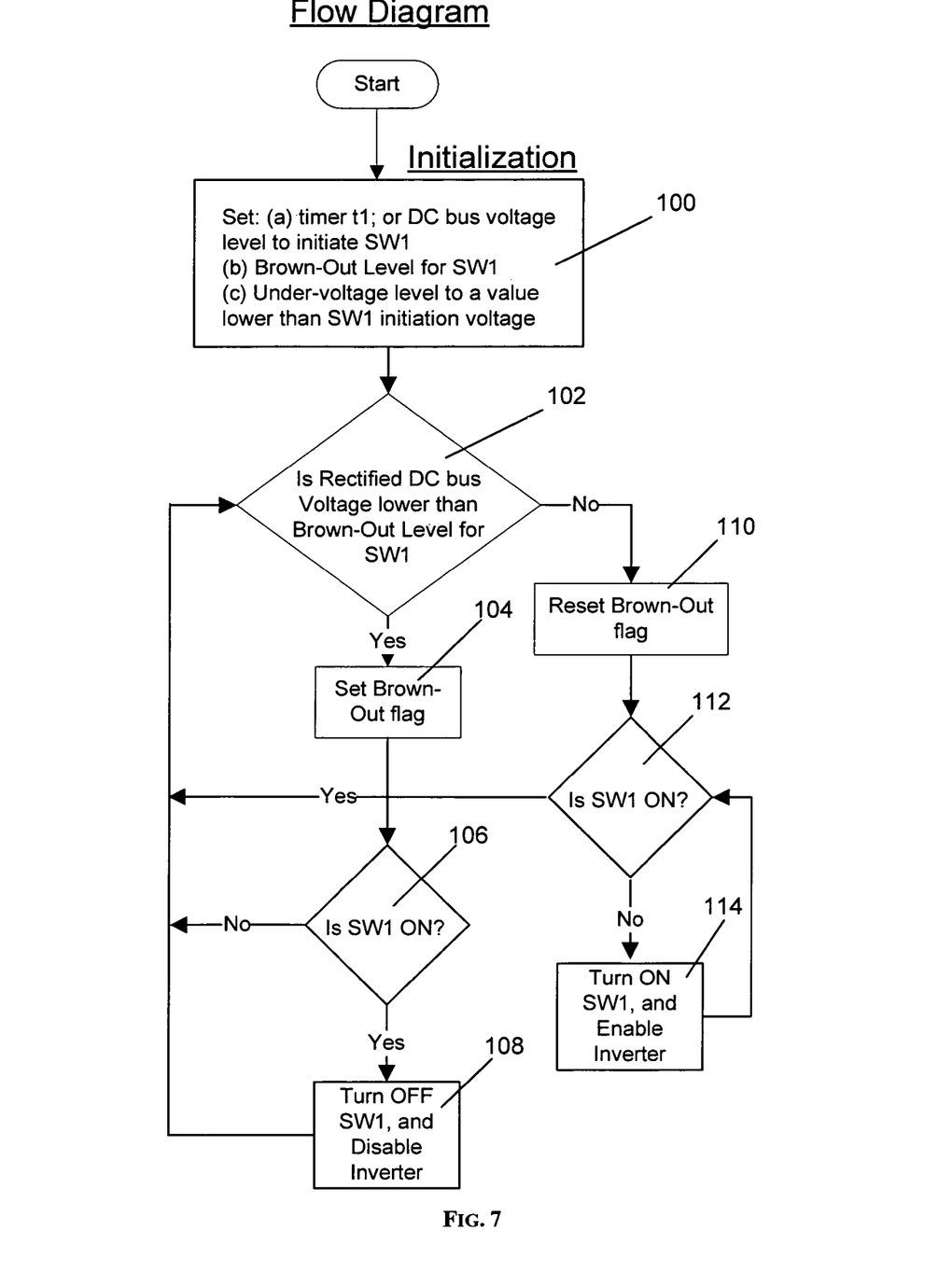
FIG. 7. Is a flow diagram illustrating logic implemented in the control logic block of FIG. 4.

The logic flow diagram that is used for the normal and brown out conditions is shown in FIG. 7. This flow diagram illustrates operation of the logic block 28.

The logic operation begins at startup at an initialization block 100. The initialization block 100 selects whether the interval 2 is initiated by timer or by DC bus voltage, based on user preference. The brown out level for the switch SW1 is set. Finally, an under voltage level is set to a value lower than the SW1 initiation voltage. A decision block 102 determines if the DC bus voltage, as determined by the sensor circuit 24, is lower than the brown out level for the switch SW1. If so, then a brown-out flag is set at a block 104. A decision block 106 determines if the switch SW1 is on. If not, then the program loops back to the block 102. If so, then the switch SW1 is turned off at a block 108 and then the program loops back to the block 102. If the DC bus voltage is not lower than the brown out level for the switch SW1, as determined at the decision block 102, then the brown-out flag is reset at a block 110. A decision block 112 determines if the switch SW1 is on. If so, then the program loops back to the block 102. If not, then the switch SW1 is turned on at a block 114 and the inverter 24 is enabled. The program then loops back to the block 112.

The present invention has been partially described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

In accordance with the invention, an alternate method to soft charge the dc bus capacitors in a VFD is described and illustrated. It is shown that by adding a dummy 3-phase inductor $L_{DUMMY}$, a neutral point 30 is obtained. The neutral point 30 can be effectively used to facilitate two-step charging, similar to a wye-delta starter for induction motors. The resulting voltage and current stress experienced by the switch SW1 is thus minimized, resulting in a low stress charging technique for an AC to DC rectifier 20 with a large DC bus capacitor $C_{DC}$. The suggested flow diagram can be used to cope with brown out conditions.

We claim:

1. A voltage source inverter comprising:
   a rectifier having an input for receiving multi phase AC power and converting the AC power to DC power at an output;
   an inverter for receiving DC power and converting the DC power to AC power;
   a link circuit connected between the rectifier circuit and the inverter circuit and comprising a DC bus having first and second rails to provide a relatively fixed DC voltage for the inverter, and a bus capacitor across the first and second rails; and
   a soft charge circuit to limit inrush current to the bus capacitor, the soft charge circuit comprising an inductor connected between the rectifier input and the second rail and a switch circuit in the second rail between the rectifier output and the bus capacitor to provide two stage charging of the bus capacitor.

2. The voltage source inverter of claim 1 wherein the inductor comprises a wye connected inductor having a neutral point connected to the second rail.

3. The voltage source inverter of claim 1 wherein the soft charge circuit further comprises a blocking diode connected between the second rail and the inductor.

4. The voltage source inverter of claim 1 wherein the soft charge circuit further comprises a sensing circuit for sensing bus voltage and a control circuit for controlling the switch circuit responsive to sensed voltage.

5. The voltage source inverter of claim 4 wherein the sensing circuit comprises a voltage divider connected across the link circuit.

6. The voltage source inverter of claim 1 wherein the soft charge circuit further comprises a control circuit for controlling the switch circuit responsive to a select time period.

7. The voltage source inverter of claim 4 wherein the control circuit turns the switch off if sensed voltage is below a select brown out level voltage.

8. A variable frequency drive comprising:
   a diode rectifier receiving multi phase AC power from a source and converting the AC power to DC power;
   an inverter for receiving DC power and converting the DC power to AC power to drive a load;
   a link circuit connected between the diode rectifier and the inverter and comprising a DC bus to provide a relatively fixed DC voltage for the inverter, a bus capacitor across the bus; and
   a soft charge circuit to limit inrush current to the bus capacitor, the soft charge circuit comprising an inductor connected between the source and the link circuit and a switch circuit in the link circuit for selectively providing a semiconverter configuration or a full bridge converter configuration to provide two stage charging of the bus capacitor.

9. The variable frequency drive of claim 8 wherein the inductor comprises a wye connected inductor having a neutral point connected to the link circuit.

10. The variable frequency drive of claim 8 wherein the soft charge circuit further comprises a blocking diode connected between the link circuit and the inductor.

11. The variable frequency drive of claim 8 wherein the soft charge circuit further comprises a sensing circuit for sensing DC bus voltage and a control circuit for controlling the switch circuit responsive to sensed voltage.

12. The variable frequency drive of claim 11 wherein the sensing circuit comprises a voltage divider connected across the link circuit.

13. The variable frequency drive of claim 8 wherein the soft charge circuit further comprises a control circuit for controlling the switch circuit responsive to a select time period.

14. A soft charge circuit for a diode rectifier front end variable frequency drive comprising:
   a DC bus having a positive rail and a negative rail to provide a relatively fixed DC voltage, a bus capacitor across the bus, an inductor connected between a diode rectifier input and the negative rail and a switch circuit in the negative rail to provide two stage charging of the bus capacitor.

15. The soft charge circuit of claim 14 wherein the inductor comprises a wye connected inductor having a neutral point connected to the second rail.

16. The soft charge circuit of claim 14 wherein the soft charge circuit further comprises a blocking diode connected between the second rail and the inductor.

17. The soft charge circuit of claim 14 wherein the soft charge circuit further comprises a sensing circuit for sensing DC bus voltage and a control circuit for controlling the switch circuit responsive to sensed voltage.

18. The soft charge circuit of claim 17 wherein the sensing circuit comprises a voltage divider connected across the link circuit.

19. The soft charge circuit of claim 14 wherein the soft charge circuit further comprises a control circuit for controlling the switch circuit responsive to a select time period.

20. The soft charge circuit of claim 17 wherein the control circuit turns the switch off if sensed voltage is below a select brown out level voltage.

* * * * *